US012317395B2

(12) United States Patent
Liao et al.

(10) Patent No.: US 12,317,395 B2
(45) Date of Patent: May 27, 2025

(54) TRAFFIC SIGNAL LAMP, TRAFFIC SIGNAL SYSTEM AND LAMP-STATE DETECTION METHOD USING THE SAME

(71) Applicant: LEOTEK CORPORATION, Taipei (TW)

(72) Inventors: Kuang-Yao Liao, Taipei (TW); Wei-Ting Wu, Taipei (TW); Jhao-Tian Pan, Taipei (TW)

(73) Assignee: LEOTEK CORPORATION, Taipei (TW)

( * ) Notice: Subject to any disclaimer, the term of this patent is extended or adjusted under 35 U.S.C. 154(b) by 160 days.

(21) Appl. No.: 18/111,289

(22) Filed: Feb. 17, 2023

(65) Prior Publication Data

US 2023/0397321 A1 Dec. 7, 2023

Related U.S. Application Data

(60) Provisional application No. 63/349,167, filed on Jun. 6, 2022.

(30) Foreign Application Priority Data

Dec. 5, 2022 (CN) ........................ 202211550600.6

(51) Int. Cl.
*G08G 1/095* (2006.01)
*H05B 47/21* (2020.01)

(52) U.S. Cl.
CPC ............. *H05B 47/22* (2020.01); *G08G 1/095* (2013.01)

(58) Field of Classification Search
None
See application file for complete search history.

(56) References Cited

FOREIGN PATENT DOCUMENTS

WO WO-2011/030920 A1 * 3/2011 ............. F21S 9/037

* cited by examiner

*Primary Examiner* — K. Wong
(74) *Attorney, Agent, or Firm* — Innovation Counsel LLP

(57) ABSTRACT

A traffic signal lamp includes a plurality of light-emitting devices. Each light-emitting device includes a light-emitting element, a power distribution module, a power module, a controller and a measuring element. The power module is configured for converting an alternating current (AC) into a direct current (DC) and supplying the DC to the light-emitting element and the power distribution module. The measuring element is electrically coupled to the power distribution module and the light-emitting element. The controller is electrically coupled to the power distribution module and the measuring element. When a selected-one of the light-emitting devices receives the AC, the power distribution modules of the selected-one provides the DC to the controller and the measuring element of the selected-one and the power distribution module of the others of the light-emitting devices.

21 Claims, 9 Drawing Sheets

TRAFFIC SIGNAL LAMP, TRAFFIC SIGNAL SYSTEM AND LAMP-STATE DETECTION METHOD USING THE SAME

This application claims the benefit of U.S. provisional application Ser. No. 63/349,167, filed Jun. 6, 2022, and the benefit of People's Republic of China application Serial No. 202211550600.6, filed Dec. 5, 2022, the subject matters of which are incorporated herein by reference.

BACKGROUND OF THE INVENTION

Field of the Invention

The invention relates in general to a traffic signal lamp, a traffic signal system and a lamp-state detection method using the same.

Description of the Related Art

Currently, when the traffic light is damaged, pedestrian informs the authority of the damage information, and then the authority notify the maintenance personnel to carry out inspection and maintenance on the spot. However, the period from the traffic light being broken to the maintenance being completed could cause many problems in traffic control. Therefore, proposing an efficient method for detecting the status of traffic light is one of the directions of continuous efforts of the industry in this technical field.

SUMMARY OF THE INVENTION

The present invention provides a traffic signal lamp, a traffic signal system and a lamp-state detection method using the same capable of resolving the above problems.

According to an embodiment of the present invention, a traffic signal lamp is provided. The traffic signal lamp includes a plurality of light-emitting devices. Each light-emitting device includes a light-emitting element, a power distribution module, a power module, a measuring element and a controller. The power module is configured to convert an alternating current into a direct current and supplying the direct current to the light-emitting element and the power distribution module. The measuring element is electrically coupled to the power distribution module and the light-emitting element. The controller is electrically coupled to the power distribution module and the measuring element. When a selected-one of the light-emitting devices receives the alternating current, the power distribution module of the selected one supplies the direct current to the controller and the measuring element of the selected one and the power distribution modules of the others of the light-emitting devices.

According to another embodiment of the present invention, a traffic signal lamp is provided. The traffic signal lamp includes a plurality of light-emitting devices and a power distribution module. Each light-emitting device includes a light-emitting element, a power module, a measuring element and a controller. The power module is configured to convert an alternating current into a first direct current and supply the first direct current to the light-emitting element. The measuring element is electrically coupled to the light-emitting element and the power module. The controller is electrically coupled to the measuring element. The power distribution module is configured to receive the alternating current and convert the alternating current into a second direct current and supply the second direct current to a power stabilization module. Wherein the power distribution module is configured to store the second direct current as a storage current and supply the storage current to the controller and the measuring element of each light-emitting device.

According to another embodiment of the present invention, a traffic signal system is provided. The traffic signal system includes a traffic signal lamp described above and a traffic light controller. The traffic light controller is configured to supply the alternating current to the traffic signal lamp.

According to another embodiment of the present invention, a lamp-state detection method of a traffic signal lamp is provided. The lamp-state detection method includes the following steps: when a selected-one of the light-emitting devices receives an alternating current, converting the alternating current into a direct current by a power module of the selected-one; providing the direct current to a light-emitting element and a power distribution module of the selected-one by the power module of the selected-one; and providing the direct current to the controller and the measuring element of the selected-one and the power distribution modules of the others of the light-emitting devices by the power distribution module of the selected-one.

According to another embodiment of the present invention, a lamp-state detection method of a traffic signal lamp is provided. The lamp-state detection method includes the following steps: when a selected-one of the light-emitting devices receives an alternating current, converting the alternating current into a first direct current by a power module of the selected-one; providing the first direct current to the light-emitting element of the selected one by the power module of the selected-one; converting the alternating current into a second direct current by a power distribution module; providing the second direct current to a power stabilization module by the power distribution module; storing the second direct current as a storage current by the power stabilization module; and providing the storage current to the controller and the measuring element of each light-emitting device by the power distribution module.

The above and other aspects of the invention will become better understood with regard to the following detailed description of the preferred but non-limiting embodiment (s). The following description is made with reference to the accompanying drawings.

DETAILED DESCRIPTION OF THE INVENTION

Figure 1A:
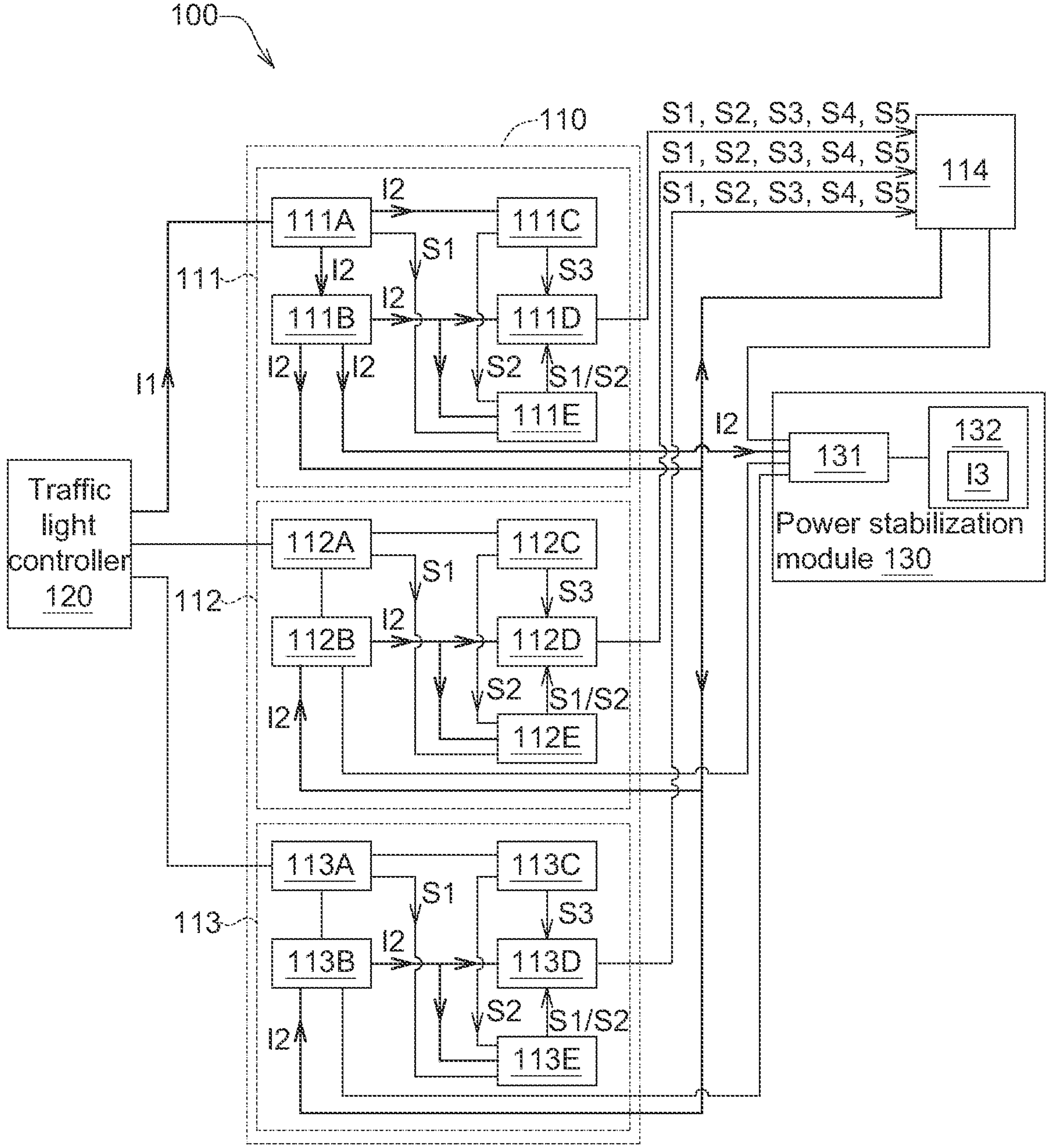
FIG. 1A shows a schematic diagram of a traffic light controller of a traffic signal system supplying power to a light-emitting device 111 according to an embodiment of the present invention.
Figure 1B:
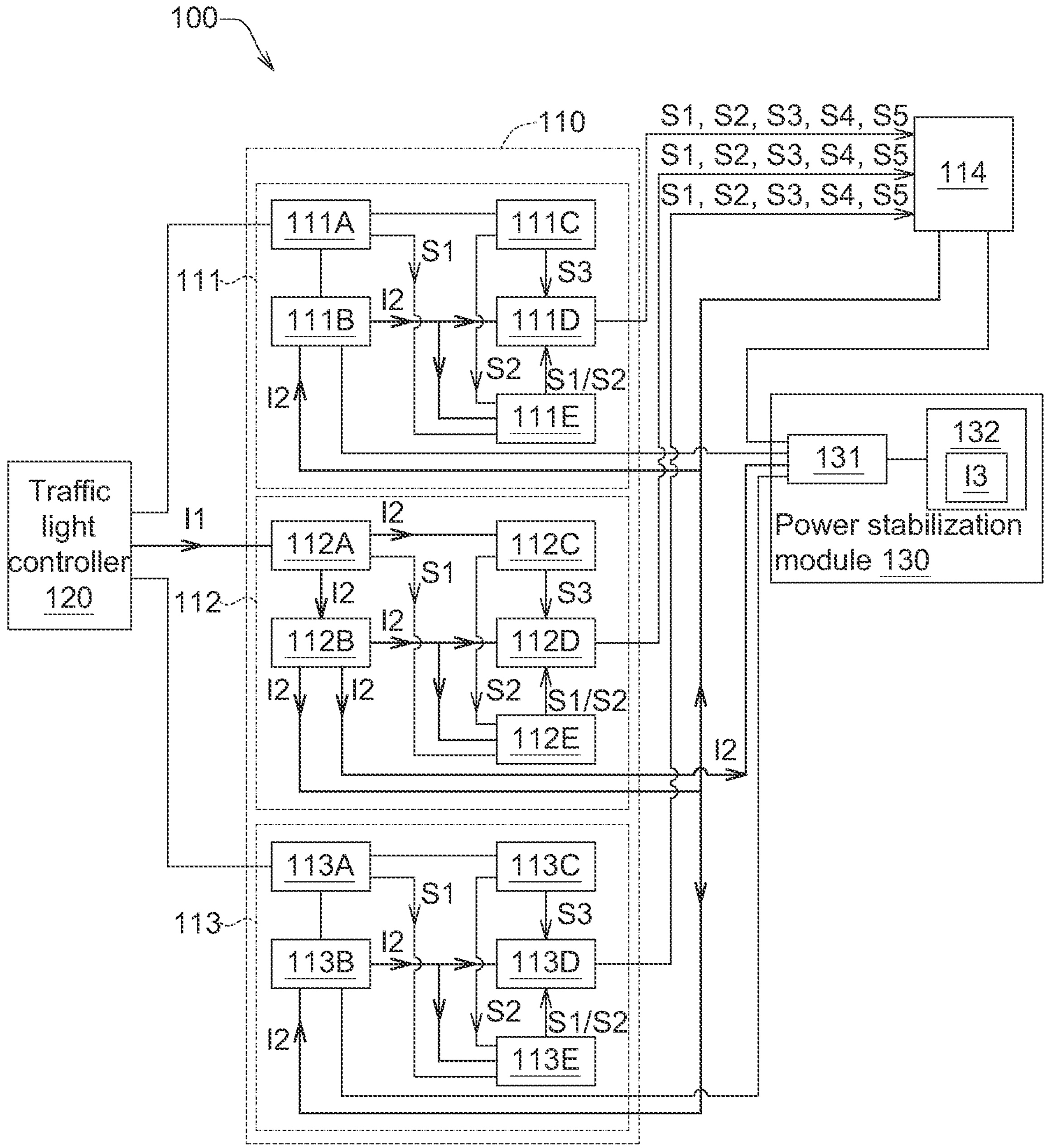
FIG. 1B shows a schematic diagram of the traffic light controller of FIG. 1A supplying power to a light-emitting device 112.
Figure 1C:
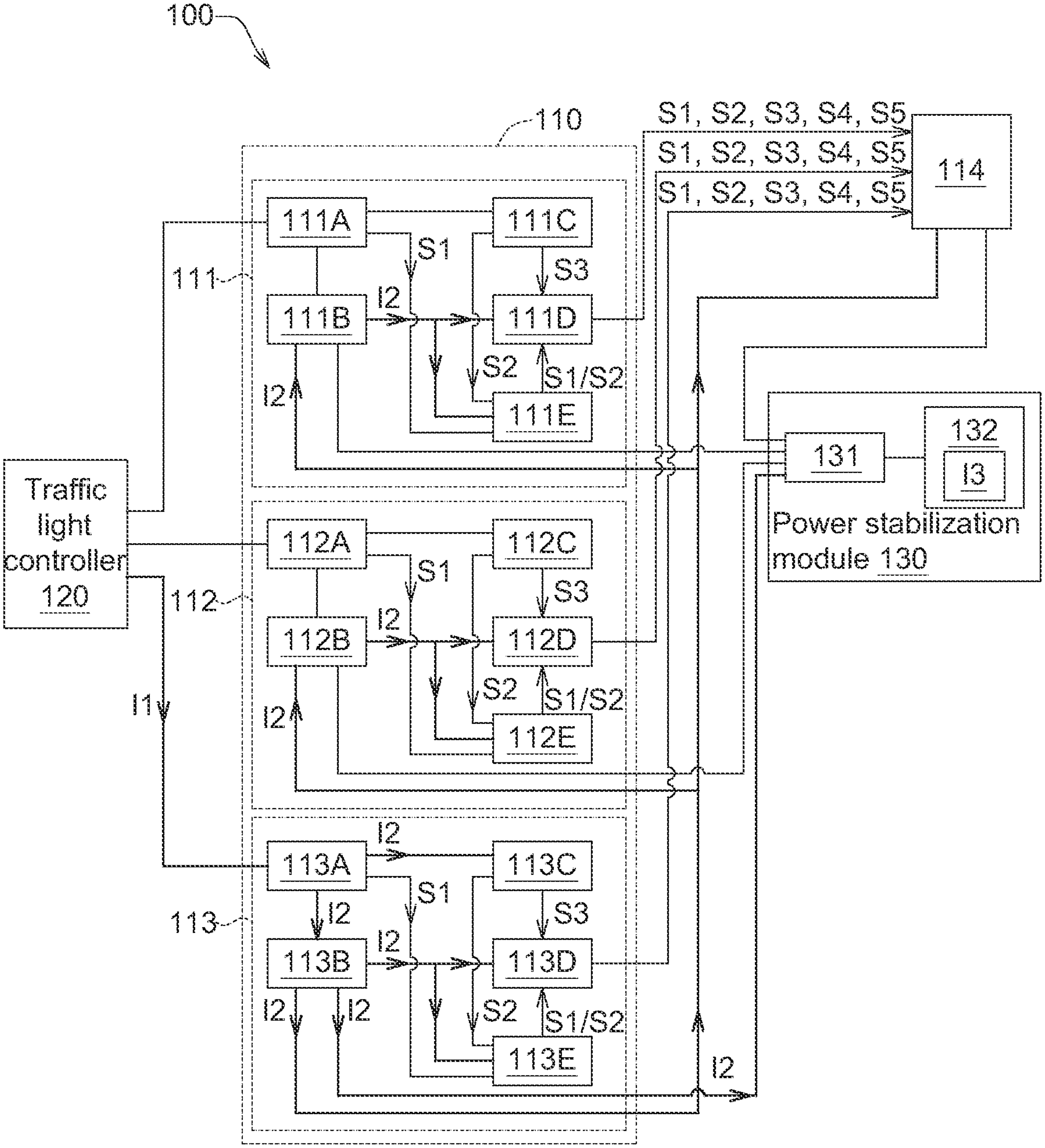
FIG. 1C shows a schematic diagram of the traffic light controller of FIG. 1A supplying power to a light-emitting device 113.
Figure 1D:
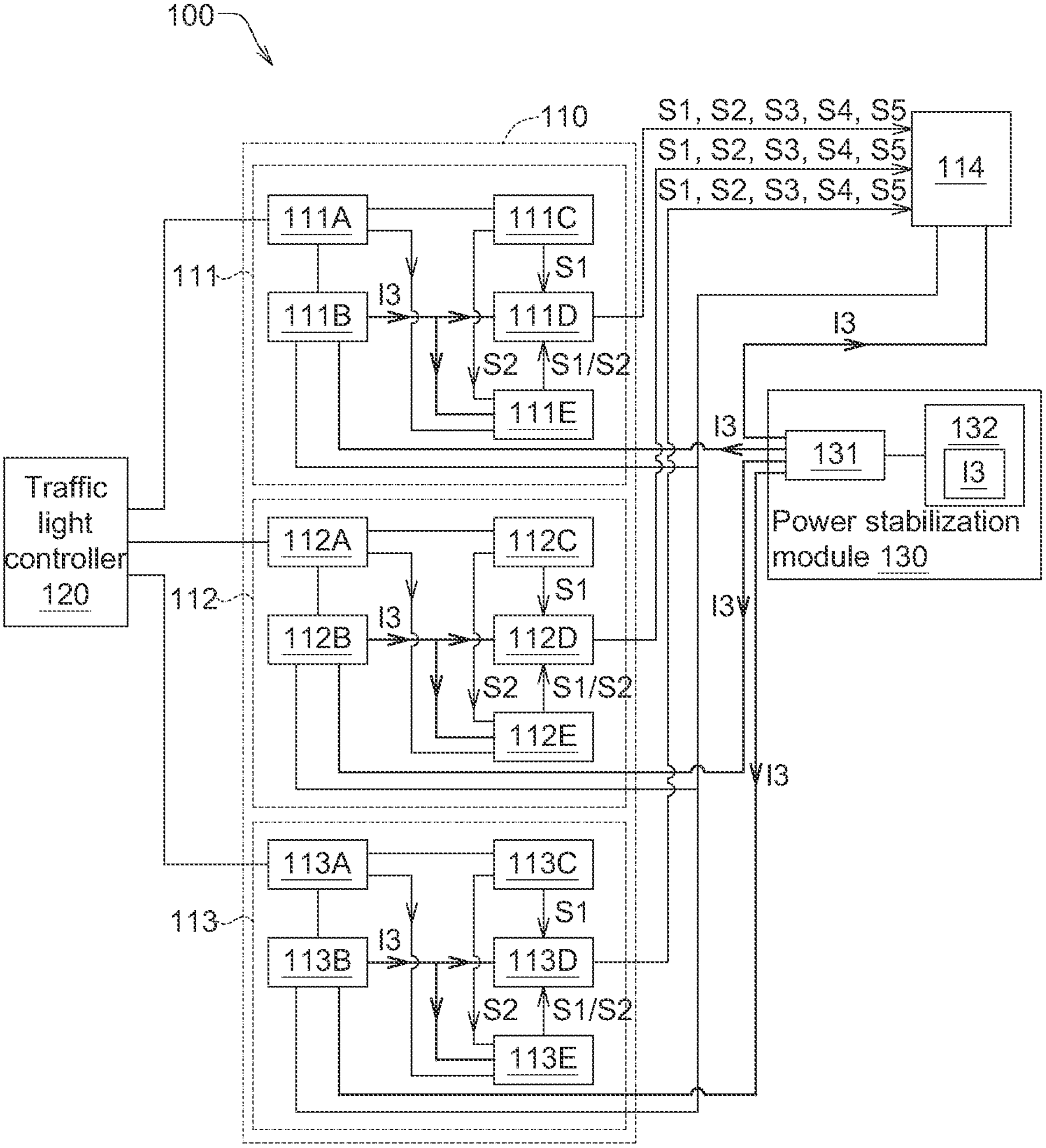
FIG. 1D shows a schematic diagram of a power stabilization module of FIG. 1A supplying power to the light-emitting devices.
Figure 1E:
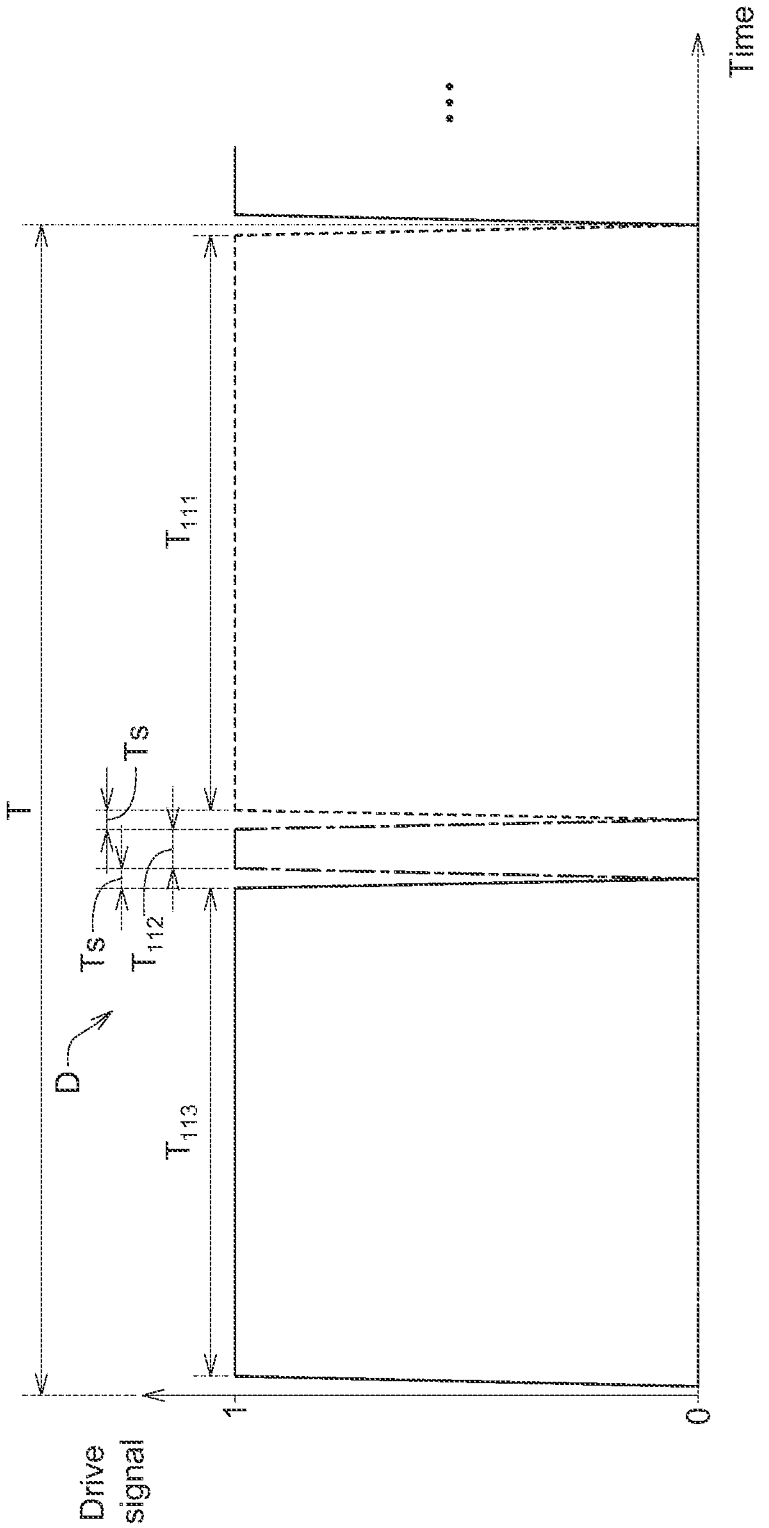
FIG. 1E shows a timing diagram of the traffic light controller of FIG. 1A controlling a traffic signal lamp.

Referring to FIGS. 1A to 1E, FIG. 1A shows a schematic diagram of a traffic light controller 120 of a traffic signal system 100 supplying power to a light-emitting device 111 according to an embodiment of the present invention, FIG. 1B shows a schematic diagram of the traffic light controller 120 of FIG. 1A supplying power to a light-emitting device 112, FIG. 1C shows a schematic diagram of the traffic light controller 120 of FIG. 1A supplying power to a light-emitting device 113, FIG. 1D shows a schematic diagram of a power stabilization module 130 of FIG. 1A supplying power to the light-emitting devices 111 to 113, and FIG. 1E shows a timing diagram of the traffic light controller 120 of FIG. 1A controlling a traffic signal lamp 110.

As shown in FIGS. 1A to 1C, the traffic signal system 100 includes a traffic signal lamp 110, a traffic light controller 120 and a power stabilization module 130. The traffic signal lamp 110 includes a plurality of light-emitting devices 111 to 113 and a wireless communication module 114. Each of the light-emitting devices 111 to 113 includes a light-emitting element, a power distribution module, a power module, a controller and a measuring element. In each light-emitting device, the power module is configured to convert an alternating current I1 (for example, supply mains) into a direct current I2 and supply the direct current I2 to the light-emitting element and the power distribution module. The controller is electrically coupled to the power distribution module. The measuring element is electrically coupled to the power distribution module and the power module. When a selected-one of the light-emitting devices receive the alternating current I1, the power distribution modules of the selected-one supplies the direct current I2 to the controller and the measuring element of the selected-one and the power distribution modules of the others of the light-emitting devices. As a result, as long as any one of the light-emitting devices 111 to 113 receives the alternating current I1 (is powered), the controllers and measuring element of the others light-emitting devices could be powered to normally operate.

Taking the light-emitting device 111 as an example, as shown in FIG. 1A, the light-emitting device 111 includes a power module 111A, a power distribution module 111B, a light-emitting element 111C, a controller 111D and a measuring element 111E. When the light-emitting device 111 (the selected-one) receives the alternating current I1 (corresponding to a driving interval $T_{111}$ in FIG. 1E), the power module 111A could convert the alternating current I1 into the direct current I2 and supply the direct current I2 to the light-emitting element 111C and the power distribution module 111B. The controller 111D is electrically coupled to the power distribution module 111B and the measuring element 111E. The measuring element 111E is electrically coupled to the power distribution module 111B and the power module 111A. When the light-emitting device 111 (the selected-one) receives the alternating current I1, the power distribution module 111B of the light-emitting device 111 supplies the direct current I2 to the controller 111D and the measuring element 111E and the power distribution modules 112B and 113B of the other light-emitting devices 112 and 113. As a result, as long as the light-emitting device 111 is powered, the controllers 112D to 113D and the measuring elements 112E to 113E of the other light-emitting devices 112 to 113 could be powered to operate normally.

The measuring element 111E could measure the driving information S1 and S2. The driving information S1 includes, for example, current data of the alternating current I1 received by the power module 111A, and the driving information S2 includes, for example, voltage data and/or current data of the direct current I2 that drives the light-emitting element 111C.

As shown in FIG. 1B, the light-emitting device 112 includes a power module 112A, a power distribution module 112B, a light-emitting element 112C, a controller 112D and a measuring element 112E. After the light-emitting device 112 receives the alternating current I1 (corresponding to a driving interval $T_{112}$ in FIG. 1E), the flow of the alternating current I1 through the light-emitting device 112 is similar to that of the light-emitting device 111 described above, and it will not be repeated here. As a result, as long as the light-emitting device 112 is powered, the controllers 111D, 113D and the measuring elements 111E, 113E of the other light-emitting devices 111 and 113 could be powered to operate normally. Similarly, the measuring element 112E could measure the driving information S1 and S2. The driving information S2 includes, for example, current data of the alternating current I1 received by the power module 112A, and the driving information S2 includes, for example, voltage data and/or current data of the direct current I2 that drives the light-emitting element 112C.

As shown in FIG. 1C, the light-emitting device 113 includes a power module 113A, a power distribution module 113B, a light-emitting element 113C, a controller 113D and a measuring element 113E. After the light-emitting device 113 (the selected-one) receives the alternating current I1 (corresponding to a driving interval $T_{113}$ in FIG. 1E), the flow of the alternating current I1 through the light-emitting device 113 is similar to that of the light-emitting device 111 described above, and it will not be repeated here. As a result, as long as the light-emitting device 113 is powered, the controllers 111D, 112D and the measuring elements 111E, 112E of the other light-emitting devices 111 and 112 could be powered to operate normally. Similarly, the measuring element 113E could measure the driving information S1 and S2. The driving information S2 includes, for example, current data of the alternating current I1 received by the power module 113A, and the driving information S2 includes, for example, voltage data and/or current data of the direct current I2 that drives the light-emitting element 113C.

The aforementioned controller is, for example, a physical circuit formed by at least one semiconductor manufacturing process. The aforementioned measuring element is, for example, a sensor, which could obtain or detect driving information S1 and S2.

In an embodiment, the light-emitting elements of each light-emitting device could emit different colors of light. For example, the light-emitting element 111C of the light-emitting device 111 could emit one of red light, orange light and green light, the light-emitting element 112C of the light-emitting device 112 could emit another of red light, orange light and green light, and the light-emitting element 113C could emit the other of red light, orange light and green light. In addition, the embodiment of the present invention does not limit the number of light-emitting devices, and it could be less than 3 or more than 3. In another embodiment, the color of light emitted by the light-emitting element could be light other than red light, orange light and green light.

As shown in FIG. 1A, in each light-emitting device, the light-emitting element is electrically coupled to the controller for transmitting the luminance information of the light-emitting element to the controller.

Taking the light-emitting device 111 as an example, as shown in FIG. 1A, the light-emitting element 111C is electrically coupled to the controller 111D, and could transmit the luminance information S3 of the light-emitting element 111C to the controller 111D. Taking the light-emitting device 112 as an example, as shown in FIG. 1B, the light-emitting element 112C is electrically coupled to the controller 112D, and could transmit the luminance information S3 of the light-emitting element 112C to the controller 112D. Taking the light-emitting device 113 as an example, as shown in FIG. 1C, the light-emitting element 113C is electrically coupled to the controller 113D, and could transmit the light emitting brightness information S3 of the light-emitting element 113C to the controller 113D.

The controller could transmit the received information to the wireless communication module 114. Taking the light-emitting device 111 as an example, as shown in FIG. 1A, the controller 111D could transmit the information to the wireless communication module 114 after receiving the driving information S1, S2 and the luminance information S3 of the light-emitting device 111. Taking the light-emitting device 112 as an example, as shown in FIG. 1B, the controller 112D could transmit the information to the wireless communication module 114 after receiving the driving information S1, S2 and the luminance information S3 of the light-emitting device 112. Taking the light-emitting device 113 as an example, as shown in FIG. 1C, the controller 113D could transmit the information to the wireless communication module 114 after receiving the driving information S1, S2 and the luminance information S3 of the light-emitting device 113.

In each light-emitting device, the controller is configured to: receive the driving information detected by the corresponding measuring element; obtain a difference between the driving information and a driving default value; determine whether the difference exceeds a driving allowable range; and when the difference exceeds the driving allowable range, generate an abnormal signal. The aforementioned driving default values could be pre-stored in the controller. Alternatively, the driving default values could be stored in a memory and the controller could access the driving default values of the memory. The embodiment of the present invention does not limit the driving default value. The driving allowable range is, for example, a ratio of the driving default value, and the ratio is, for example, a real number ranging between 1% and 10%.

Taking the light-emitting device 111 as an example, as shown in FIG. 1A, the controller 111D of the light-emitting device 111 is configured to: receive the driving information (S1 and/or S2) detected by the measuring element 111E; obtain the difference between the driving information (S1 and/or S2) and the driving default value; determine whether the difference exceeds the driving allowable range; and when the difference exceeds the driving allowable range, generate a driving abnormal signal S4. When the difference does not exceed the driving allowable range, the controller 111D could not generate the driving abnormal signal S4. In another embodiment, the controller 111D could transmit the driving information (S1 and/or S2) to the wireless communication module 114 regardless of whether the difference exceeds the driving allowable range. As shown in FIG. 1B, the controller 112D of the light-emitting device 112 could perform the same or similar actions, and it will not be repeated here. As shown in FIG. 1C, the controller 113D of the light-emitting device 113 could perform the same or similar actions, and it will not be repeated here.

In each light-emitting device, the controller is further configured to: receive a luminance information of the corresponding light-emitting element; obtain a difference between the luminance information and a luminance preset value; determine whether the difference exceeds a luminance allowable range; and when the difference exceeds the luminance allowable range, generate a luminance abnormal signal. The above luminance preset value could be pre-stored in the controller; alternatively, the luminance preset value could be stored in a memory, and the controller could access the luminance preset value in the memory. The embodiments of the present invention do not limit the luminance preset value. The luminance allowable range is, for example, a ratio of the luminance preset value, wherein the ratio is, for example, a real number ranging between 1% and 10%.

Taking the light-emitting device 111 as an example, as shown in FIG. 1A, the controller 111D of the light-emitting device 111 is further configured to: receive the luminance information S3 of the light-emitting element 111C; obtain the difference between the luminance information S3 and the luminance preset value; determine whether the difference exceeds the luminance allowable range; and when the difference exceeds the luminance allowable range, generate the luminance abnormal signal S5. When the difference does not exceed the luminance allowable range, the controller 111D could not generate the luminance abnormal signal S5. The controller 111D could transmit the luminance abnormal signal S5 to the wireless communication module 114. In another embodiment, the controller 111D could transmit the luminance information S3 to the wireless communication module 114 regardless of whether the difference exceeds the luminance allowable range. As shown in FIG. 1B, the controller 112D of the light-emitting device 112 could perform the same or similar actions, and it will not be repeated here. As shown in FIG. 1C, the controller 113D of the light-emitting device 113 could perform the same or similar actions, and it will not be repeated here.

In addition to the above-mentioned information, the controller of each light-emitting device could also obtain, from the measuring element, the light-emitting element, the driving information S1 and S2 and/or the luminance information S3, information such as the light-emitting time of the light-emitting elements, damaged quantity of the of the light-emitting elements and/or damaged ratio of the of the light-emitting elements, and transmit such information to the wireless communication module 114.

As described above, as long as the selected-one of the light-emitting devices is powered, the controllers and measuring elements of the other light-emitting devices could be powered. Thus, in the driving interval of the selected-one (is powered) of the light-emitting devices, the controller and measuring element of each light-emitting device could normally and constantly obtain the information of the light-emitting element and the power module.

As shown in FIGS. 1A to 1C, the wireless communication module 114 could, by using wireless communication technology, communicate with a management platform or an external electronic device (not shown), such as a server, a computer or a smart phone, etc. The wireless communication module 114 could transmit the received signals of each light-emitting device (for example, the driving information S1 and S2, the luminance information S3, the driving abnormal signal S4 and/or the luminance abnormal signal S5) to the management platform and/or the external electronic device. The operator could monitor the actual status of the traffic signal lamp 110 through the management platform or an external electronic device.

As shown in FIGS. 1A to 1C, in each light-emitting device, when the light-emitting device (the selected-one) receives the alternating current I1 (corresponding to the driving interval T113 of FIG. 1E), the power module could supply the direct current I2 to the wireless communication module 114 for the normal operation of the wireless communication module 114. For example, the signal (for example, the driving information S1 and S2, the luminance information S3, the driving abnormal signal S4 and/or the luminance abnormal signal S5) received by each light-emitting device is transmitted to the management platform or an external electronic device.

As shown in FIG. 1E, the traffic light controller 120 could output a driving signal D, so that the light-emitting elements of each light-emitting device of the traffic signal lamp 110 are enabled to emit light in the corresponding driving interval (the driving interval of the selected-one) (it does not emit light in the non-corresponding driving interval). FIG. 1C only shows one driving period T, but the driving signal D could have multiple continuous driving periods T or multiple driving periods T with different time lengths. In one driving cycle T of the driving signal D, the driving interval $T_{111}$ represents the driving time of the traffic light controller 120 for the light-emitting device 111, the driving interval $T_{112}$ represents the driving time of the traffic light controller 120 for the light-emitting device 112, and the driving interval T113 represents the driving time of the traffic light controller 120 for the light-emitting device 113. in addition, although not shown, there is a short power supply interval $T_s$ between two adjacent driving intervals, and in the power supply interval $T_s$, the light-emitting device is not powered. However, in the power supply interval $T_s$, the power stabilization module 130 could supply power to each light-emitting device to maintain its normal operation. Further examples are described below.

As shown in FIGS. 1A to 1C, the power distribution module of each light-emitting device is electrically coupled to the power stabilization module 130. For example, the power distribution module 111B of the light-emitting device 111, the power distribution module 112B of the light-emitting device 112 and the power distribution module 113B of the light-emitting device 113 are electrically coupled to the power stabilization module 130. The power distribution module could supply the direct current I2 to the power stabilization module 130 for being stored. For example, when the traffic light controller 120 supplies the alternating current I1 to the light-emitting device 111 (as shown in FIG. 1A), the power distribution module 111B of the light-emitting device 111 could supply the direct current I2 to the power stabilization module 130 for being stored. When the traffic light controller 120 supplies the alternating current I1 to the light-emitting device 112 (as shown in FIG. 1B), the power distribution module 112B of the light-emitting device 112 could supply the direct current I2 to the power stabilization module 130 for being stored. When the traffic light controller 120 supplies the alternating current I1 to the light-emitting device 113 (as shown in FIG. 1C), the power distribution module 113B of the light-emitting device 113 could supply the direct current I2 to the power stabilization module 130 for being stored.

As shown in FIGS. 1A to 1C, the power stabilization module 130 includes a power output unit 131 and a power storage unit 132. The power output unit 131 is electrically coupled to the power storage unit 132. The power output unit 131 could supply the direct current I2 to the power storage unit 132 for being stored (storage current I3). The power output unit 131 is a physical circuit formed by, for example, at least one semiconductor manufacturing process, and the power storage unit 132 is, for example, a battery.

As shown in FIG. 1D, when all light-emitting devices 111 to 113 do not receive the alternating current I1 (for example, in the power supply interval $T_s$ of FIG. 1E), the power supply stabilization module 130 could supply the storage current I3 (for example, direct current) to the power distribution modules 111B to 113B of all light-emitting devices 111 to 113. As a result, even if all light-emitting devices 111 to 113 are not driven by the alternating current I1 within the power supply interval $T_s$, the power stabilization module 130 is still powered to operate normally.

As shown in FIG. 1D, after the power distribution modules 111B to 113B receive the storage current I3, the power distribution modules 111B to 113B could supply power to the controller, measuring element and wireless communication module by using the methods described for FIGS. 1A to 1C. Taking the light-emitting device 111 as an example, as shown in FIG. 1A, after the power distribution module 111B receives the storage current I3, the power distribution module 111B could supply the storage current I3 to the controller 111D and the measuring element 111E, and the controller 111D and measuring element 111E could perform the same actions as described for FIG. 1A. Taking the light-emitting device 112 as an example, as shown in FIG. 1B, after the power distribution module 112B receives the storage current I3, the power distribution module 112B could supply the storage current I3 to the controller 112D and the measuring element 112E, and the controller 112D and measuring element 112E could perform the same actions as described for FIG. 1A. Taking the light-emitting device 113 as an example, as shown in FIG. 1C, after the power distribution module 113B receives the storage current I3, the power distribution module 113B could supply the storage current I3 to the controller 113D and the measuring element 113E, and the controller 113D and measuring element 113E could perform the same actions as described for FIG. 1A.

As shown in FIG. 1D, when all light-emitting devices 111 to 113 do not receive the alternating current I1 (for example, in the power supply interval $T_s$ of FIG. 1E), the power supply stabilization module 130 could supply the storage current I3 (for example, the direct current) to the wireless communication module 114 for the normal operation of the wireless communication module 114. For example, the received signal (for example, the driving information S1 and S2, the luminance information S3, the driving abnormal signal S4 and/or the luminance abnormal signal S5) of each light-emitting device is transmitted to the management platform or an external electronic device. As a result, even if all light-emitting devices 111 to 113 are not driven by the alternating current I1 within the power supply interval $T_s$, the power stabilization module 130 still supplies power to the wireless communication module 114 so that the wireless communication module 114 could operate normally.

To sum up, no matter whether the traffic signal lamp 110 is driven by the alternating current I1 or not, the measuring element and the controller of each light-emitting device of the traffic signal lamp 110 could constantly be in the powered state. In addition, when the selected-one of the light-emitting devices of the traffic signal lamp 110 is driven by the alternating current I1, the selected-one supplies power to its own controller and the measuring element as well as the controller and the measuring element of other light-emitting devices. When the traffic signal lamp 110 is not driven by the alternating current I1, the power supply stabilization module 130 supplies power to the controller and the measuring element of each light-emitting device.

Furthermore, it takes a period of time for the measuring element and the controller to start from the unpowered state to the normal operation state, and such period of time causes a detection empty-window period. Since the measuring element and the controller of each light-emitting device in the embodiments of the present invention could be constantly powered, they could constantly be in the normal operation state, and accordingly it could avoid the detection empty-window period. In addition, conventional measuring element and controller need enough power to be the normal operation state from the unpowered state, and thus the controller can't operate if the power supply time is very short (for example, the driving interval $T_{112}$ in FIG. 1E). However, since the measuring element and the controller of the embodiment of the present invention could constantly be in the powered state, it is not required to consider whether the time required for enabling is sufficient.

Figure 2A:
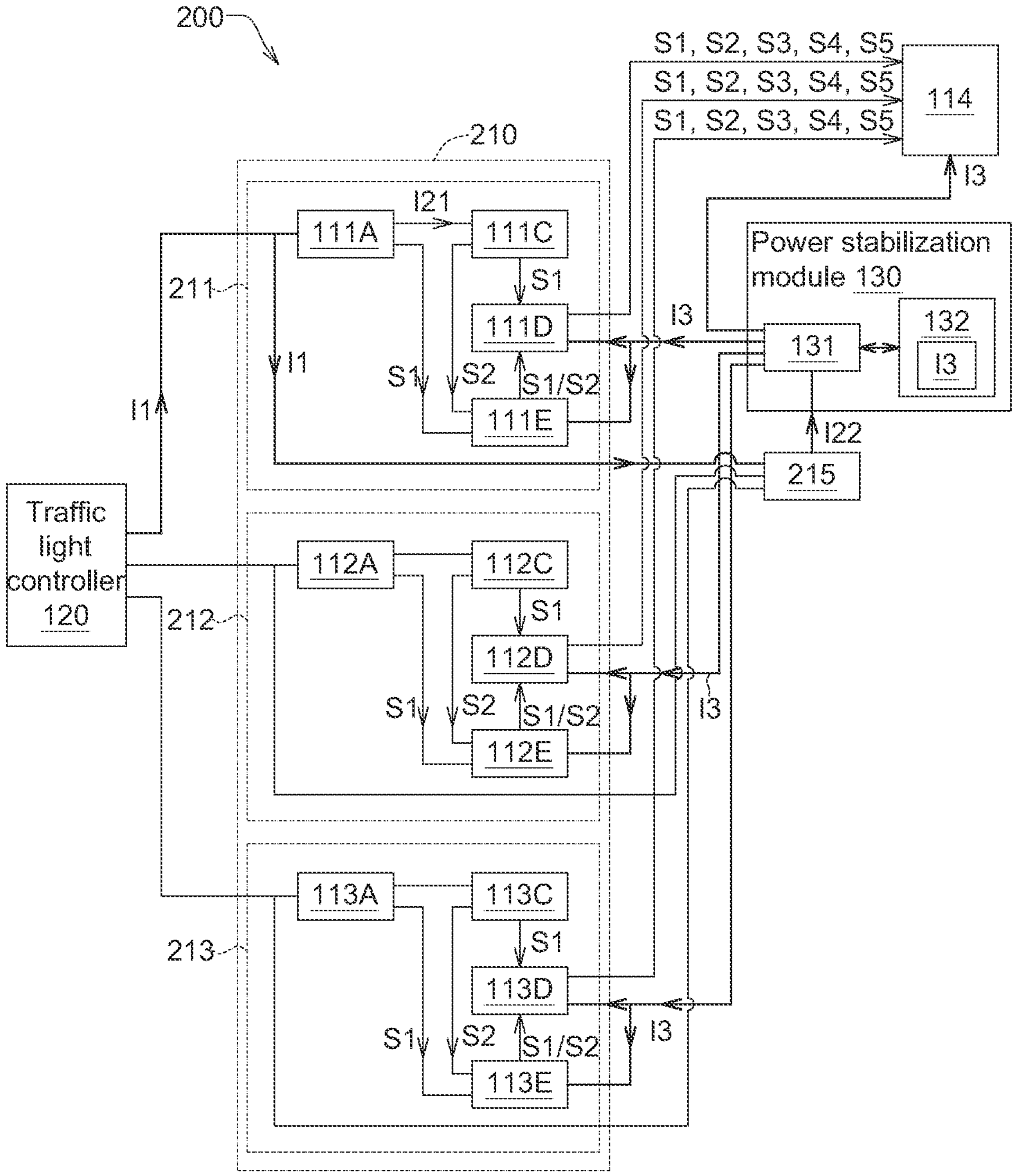
FIG. 2A shows a schematic diagram of a traffic light controller of a traffic signal system supplying power to a light-emitting device 211 according to another embodiment of the present invention.
Figure 2B:
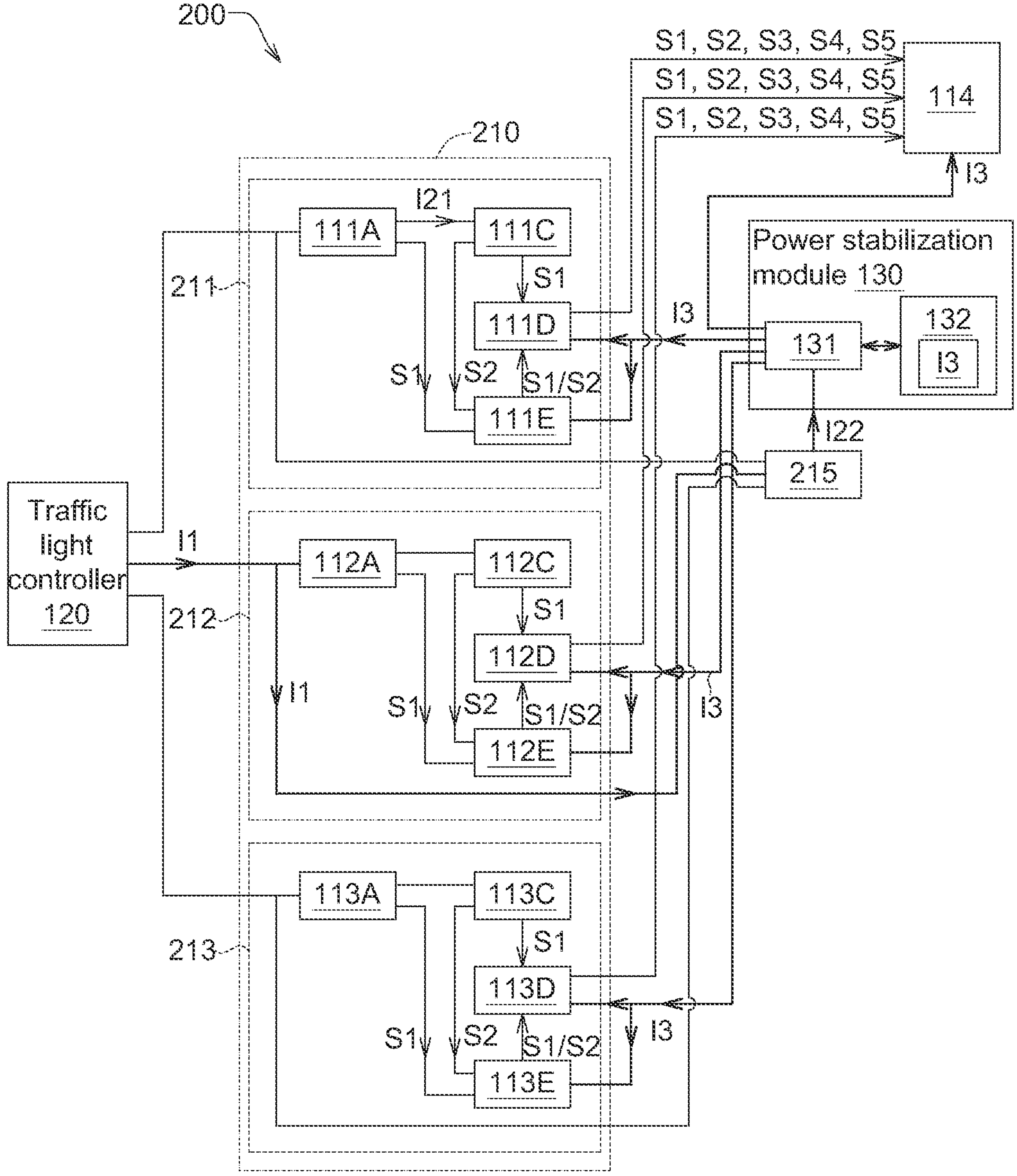
FIG. 2B shows a schematic diagram of the traffic light controller of FIG. 2A supplying power to the light-emitting device 212.
Figure 2C:
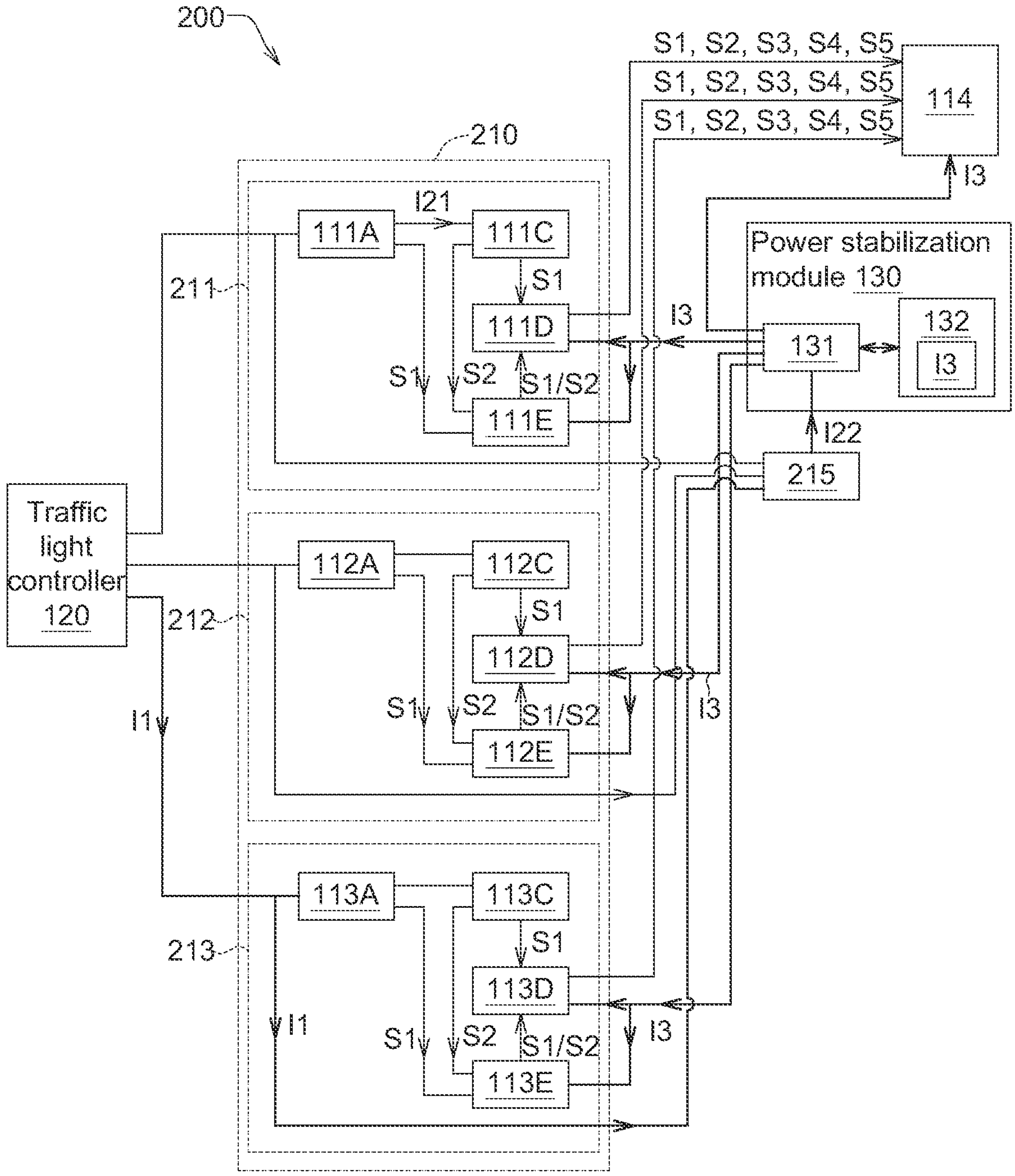
FIG. 2C shows a schematic diagram of the traffic light controller of FIG. 2A supplying power to the light-emitting device 213.

Referring to FIGS. 2A to 2C, FIG. 2A shows a schematic diagram of a traffic light controller 120 of a traffic signal system 200 supplying power to a light-emitting device 211 according to another embodiment of the present invention, FIG. 2B shows a schematic diagram of the traffic light controller 120 of FIG. 2A supplying power to the light-emitting device 212, and FIG. 2C shows a schematic diagram of the traffic light controller 120 of FIG. 2A supplying power to the light-emitting device 213. The traffic signal system 200 includes the traffic signal lamp 210, the traffic light controller 120 and the power stabilization module 130. The traffic signal lamp 210 includes a plurality of the light-emitting devices 211 to 213, the wireless communication module 114 and a power distribution module 215. The power distribution module 215 is, for example, a physical circuit formed by at least one semiconductor manufacturing process.

It is different from the aforementioned traffic signal system 100, the controller and the measuring element of each light-emitting device in the traffic signal system 200 of the embodiment of the present invention are uniformly powered by the power supply stabilization module 130, and it will be further described below.

As shown in FIGS. 2A to 2C, the light-emitting devices 211 to 213 each includes the light-emitting element, the power module, the controller, and the measuring element, wherein the power module could convert the alternating current I1 into a first direct current I21 and transmit the first direct current I21 to the light-emitting element, and the measuring element is electrically coupled to the light-emitting element and the power module. The power distribution module 215 is configured to convert the alternating current I1 into a second direct current I22 and transmit the second direct current I22 to the power stabilization module 130. The power distribution module 130 is configured to store the second direct current I22 as the storage current I3, and supply the storage current I3 to the controller and the measuring element of each light-emitting device. As a result, the controller and the measuring element of each light-emitting device could constantly receive the power supplied by the power stabilization module 130, and thus could operate normally.

Taking the light-emitting device 211 as an example, as shown in FIG. 2A, the light-emitting device 211 includes the power module 111A, the light-emitting element 111C, the controller 111D and the measuring element 111E. The power module 111A could convert the alternating current I1 into the first direct current I21 and supply the first direct current I21 to the light-emitting element 111C. The measuring element 111E is electrically coupled to the power module 111A and the light-emitting element 111C. The power distribution module 215 is configured to convert the alternating current I1 into the second direct current I22 and supply the second direct current I22 to the power stabilization module 130. The power stabilization module 130 is configured to store the second direct current I22 as the storage current I3, and supply the storage current I3 to the controllers 111D to 113D and the measuring elements 111E to 113E of the light-emitting devices 211 to 213. As a result, the controllers 111D to 113D and the measuring elements 111E to 113E of the light-emitting devices 111 to 113 could constantly receive power supplied by the power stabilization module 130, and could operate constantly and normally.

Taking the light-emitting device 212 as an example, as shown in FIG. 2B, the light-emitting device 212 includes the power module 112A, the light-emitting element 112C, the controller 112D and the measuring element 112E. The measuring element 112E is electrically coupled to the power module 112A and the light-emitting element 112C. The power module 112A, the measuring element 112E, and the light-emitting element 112C could perform similar or identical actions, and it will not be repeated here. As a result, the controllers 111D to 113D and the measuring elements 111E to 113E of the light-emitting devices 211 to 213 could constantly receive power supplied by the power stabilization module 130, and could operate constantly and normally.

Taking the light-emitting device 213 as an example, as shown in FIG. 2C, the light-emitting device 213 includes the power module 113A, the light-emitting element 113C, the controller 113D and the measuring element 113E. The measuring element 113E is electrically coupled to the power module 113A and the light-emitting element 113C. The power module 113A, the measuring element 113E, and the light-emitting element 113C could perform similar or identical actions, and it will not be repeated here. As a result, the controllers 111D to 113D and the measuring elements 111E to 113E of the light-emitting devices 211 to 213 could constantly receive power supplied by the power stabilization module 130, and could operate constantly and normally.

In the present embodiment, the power distribution module 215 could convert the alternating current I1 into the second direct current I22. However, in another embodiment, the power distribution module 215 could not have the function of converting AC to DC; correspondingly, the traffic signal system 200 further includes a power module (not shown) connecting the power distribution module 215 with the traffic light controller 120 for converting the alternating current I1 supplied by the traffic light controller 120 into the second direct current I22 and supply the second direct current I22 to the power stabilization module 130.

In addition, the power stabilization module 130 could supply the storage current I3 to the wireless communication module 114, in addition to uniformly supplying power to the controller and the measuring element of each light-emitting device of the traffic signal system 200.

Figure 3:
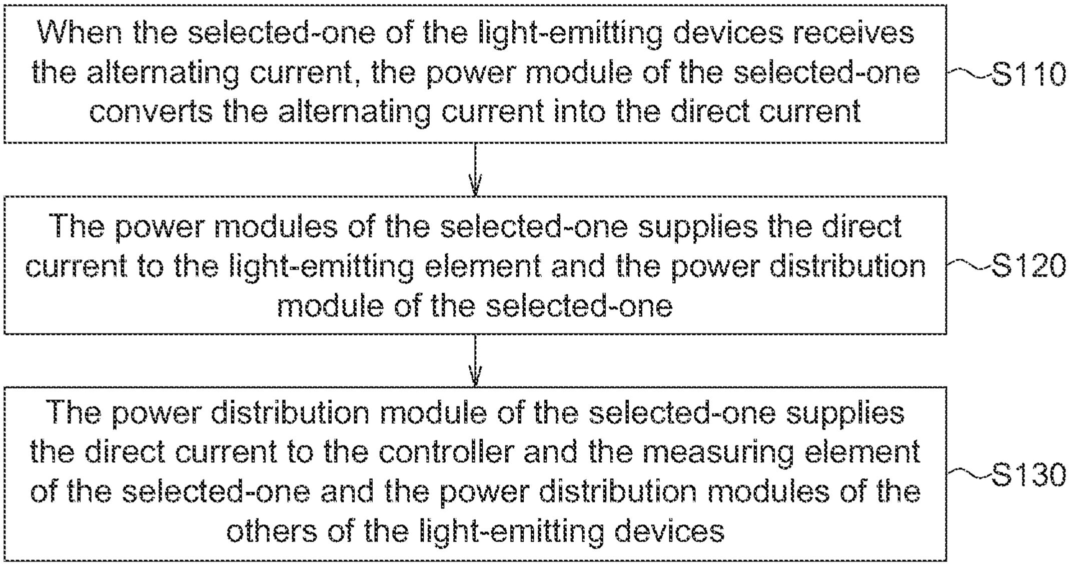
FIG. 3 shows a flow chart of the lamp-state detection method of the traffic signal lamp of the traffic signal system in FIGS. 1A to 1D.

Referring to FIG. 3, FIG. 3 shows a flow chart of the lamp-state detection method of the traffic signal lamp of the traffic signal system 100 in FIGS. 1A to 1D.

In step S110, when the selected-one of the light-emitting devices 111 to 113 receives the alternating current I1, the power module of the selected-one converts the alternating current I1 into the direct current I2.

In step S120, the power module of the selected-one supplies the direct current I2 to the light-emitting element and the power distribution module of the selected-one.

In step S130, the power distribution module of the selected-one supplies the direct current I2 to the controller and the measuring element of the selected-one and the power distribution modules of the others of the light-emitting devices 111 to 113.

Other embodiments of the lamp-state detection method of the traffic signal lamp of the traffic signal system 100 according to the embodiment of the present invention have been described above, and it will not be repeated here.

Figure 4:
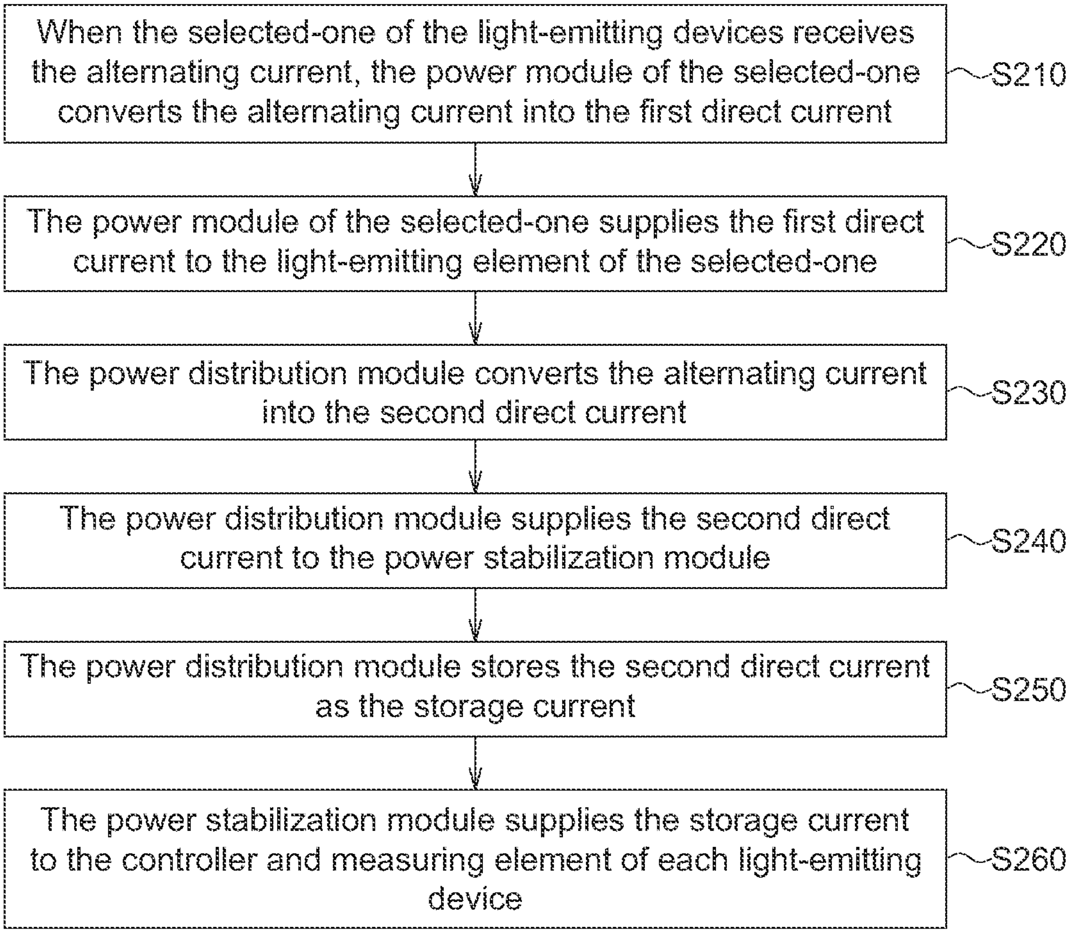
FIG. 4 shows a flow chart of the lamp-state detection method of the traffic signal lamp of the traffic signal system in FIG. 2A to 2C.

Referring to FIG. 4, FIG. 4 shows a flow chart of the lamp-state detection method of the traffic signal lamp of the traffic signal system 200 in FIG. 2A to 2C.

In step S210, when the selected-one of the light-emitting devices 211 to 213 receives the alternating current I1, the power module of the selected-one converts the alternating current I1 into the first direct current I21.

In step S220, the power module of the selected-one supplies the first direct current I21 to the light-emitting element of the selected-one.

In step S230, the power distribution module 215 converts the alternating current I1 into the second direct current I22.

In step S240, the power distribution module 215 supplies the second direct current I22 to the power stabilization module 130.

In step S250, the power distribution module 130 stores the second direct current I22 as the storage current I3.

In step S260, the power stabilization module 130 supplies the storage current I3 to the controller and measuring element of each light-emitting device. Furthermore, the power stabilization module 130 supplies the storage current I3 to the controllers 111D to 113D and measuring elements 111E to 113E of the light-emitting devices 211 to 213.

Other embodiments of the lamp-state detection method of the traffic signal lamp of the traffic signal system 200 according to the embodiment of the present invention have been described above, and it will not be repeated here.

To sum up, the embodiment of the present invention proposes a traffic signal lamp, a traffic signal system and a lamp-state detection method using the same, the controller and/or the measurement of each light-emitting device of the traffic signal lamp could be constantly powered and could operate normally, regardless of whether the enabling time is sufficient. In an embodiment, when the selected-one of the light-emitting devices receive the alternating current, the selected-one supplies power to the controllers and/or the measuring elements of all light-emitting devices, and charge the power stabilization module at the same time. When all light-emitting devices do not receive the alternating current, the power stabilization module supplies power (the storage current) to the controllers and/or the measuring elements of all light-emitting devices. In another embodiment, when the selected-one of the light-emitting devices receive the alternating current, the selected-one charge the power distribution module, and the power distribution module uniformly supplies power (the storage current) to the controllers and/or the measuring element of all light-emitting devices. As a result, all light-emitting devices could be constantly powered, so that their components (for example, the measuring element and/or the controller, etc.) could operate constantly normally.

While the invention has been described by way of example and in terms of the preferred embodiment (s), it is to be understood that the invention is not limited thereto. Based on the technical features embodiments of the present invention, a person ordinarily skilled in the art will be able to make various modifications and similar arrangements and procedures without breaching the spirit and scope of protection of the invention. Therefore, the scope of protection of the present invention should be accorded with what is defined in the appended claims.

What is claimed is:

1. A traffic signal lamp, comprising:
- a plurality of light-emitting devices each comprising:
  - a light-emitting element configured to emit light;
  - a power distribution module;
  - a power module configured to convert an alternating current into a direct current and supplying the direct current to the light-emitting element and the power distribution module;
  - a measuring element electrically coupled to the power distribution module and the light-emitting element; and
  - a controller electrically coupled to the power distribution module and the measuring element;
- wherein when a selected-one of the light-emitting devices receives the alternating current, the power distribution module of the selected one supplies the direct current to the controller and the measuring element of the selected one and the power distribution modules of the others of the light-emitting devices;
- wherein color of the light of the light-emitting element of one of the light-emitting devices is different from color of the light of the light-emitting element of another of the light-emitting devices.

2. The traffic signal lamp as claimed in claim 1, wherein the power distribution module of each light-emitting device is electrically coupled to a power stabilization module; the power distribution module of the selected-one is configured to supply the direct current to the power stabilization module for being stored.

3. The traffic signal lamp as claimed in claim 1, wherein the power distribution module of each light-emitting device is electrically coupled to a power stabilization module; when all light-emitting devices do not receive the alternating current, the power stabilization module supplies a storage current to the power distribution modules of all light-emitting devices.

4. The traffic signal lamp as claimed in claim 1, wherein the controller of each light-emitting device is configured to:
- receive a driving information detected by the corresponding measuring element;
- obtain a difference between the driving information and a driving default value;
- determine whether the difference exceeds a driving allowable range; and
- generate a driving abnormal signal when the difference exceeds the driving allowable range.

5. The traffic signal lamp as claimed in claim 1, wherein the controller of each light-emitting device is configured to:
- receive a luminance information of the corresponding light-emitting element;
- obtain a difference between the luminance information and a luminance preset value;

determine whether the difference exceeds a luminance allowable range; and generate a luminance abnormal signal when the difference exceeds the luminance allowable range.

6. The traffic signal lamp as claimed in claim 1, further comprising:

a wireless communication module electrically coupled to the power distribution module of each light-emitting device and a power stabilization module;

wherein the power distribution module of the selected-one supplies the direct current to the wireless communication module when the selected-one of the light-emitting devices receives the alternating current;

wherein the power stabilization module supplies a storage current to the wireless communication module when all of the light-emitting devices do not receive the alternating current.

7. A traffic signal lamp, comprising:

a plurality of light-emitting devices each comprising:

a light-emitting element;

a power module configured to convert an alternating current into a first direct current and supply the first direct current to the light-emitting element;

a measuring element electrically coupled to the light-emitting element and the power module; and a controller electrically coupled to the measuring element; and a power distribution module configured to receive the alternating current and convert the alternating current into a second direct current and supply the second direct current to a power stabilization module;

wherein the power stabilization module is configured to store the second direct current as a storage current and supply the storage current to the controller and the measuring element of each light-emitting device;

wherein color of the light of the light-emitting element of one of the light-emitting devices is different from color of the light of the light-emitting element of another of the light-emitting devices.

8. The traffic signal lamp as claimed in claim 7, further comprising:

a wireless communication module electrically coupled to the power stabilization module;

wherein the power stabilization module is further configured to supply the storage current to the wireless communication module.

9. The traffic signal lamp as claimed in claim 7, wherein the controller of each light-emitting device is configured to:

receive a driving information detected by the corresponding measuring element;

obtain a difference between the driving information and a driving default value;

determine whether the difference exceeds a driving allowable range; and generate a driving abnormal signal when the difference exceeds the driving allowable range.

10. The traffic signal lamp as claimed in claim 7, wherein the controller of each light-emitting device is configured to:

receive a luminance information of the corresponding light-emitting element;

obtain a difference between the luminance information and a luminance preset value;

determine whether the difference exceeds a luminance allowable range; and generate a luminance abnormal signal when the difference exceeds the luminance allowable range.

11. A traffic signal system, comprising:

a traffic signal lamp as claimed in claim 1; and a traffic light controller is configured to supply the alternating current to the traffic signal lamp.

12. A lamp-state detection method of a traffic signal lamp, comprising:

when a selected-one of a plurality of light-emitting devices receives an alternating current, converting the alternating current into a direct current by a power module of the selected-one, wherein each light-emitting device further comprises a light-emitting element configured to emit light, and color of the light of the light-emitting element of one of the light-emitting devices is different from color of the light of the light-emitting element of another of the light-emitting devices;

providing the direct current to a light-emitting element and a power distribution module of the selected-one by the power module of the selected-one; and providing the direct current to the controller and the measuring element of the selected-one and the power distribution modules of the others of the light-emitting devices by the power distribution module of the selected-one.

13. The lamp-state detection method as claimed in claim 12, further comprising:

providing the direct current to the power stabilization module for being stored by the power distribution module of the selected-one.

14. The lamp-state detection method as claimed in claim 12, further comprising:

when all of the light-emitting devices do not receive the alternating current, the power stabilization module supplies a storage current to the power distribution modules of all of the light-emitting devices.

15. The lamp-state detection method as claimed in claim 12, further comprising:

receiving a driving information detected by the corresponding measuring element;

obtaining a difference between the driving information and a driving default value;

determine whether the difference exceeds a driving allowable range; and generate a driving abnormal signal when the difference exceeds the driving allowable range.

16. The lamp-state detection method as claimed in claim 12, further comprising:

receiving a luminance information of the corresponding light-emitting element;

obtaining a difference between the luminance information and a luminance preset value;

determining whether the difference exceeds a luminance allowable range; and generating a luminance abnormal signal when the difference exceeds the luminance allowable range.

17. The lamp-state detection method as claimed in claim 12, further comprising:

when the selected-one of the light-emitting devices receives the alternating current, providing the direct current to the wireless communication module by the power distribution module of the selected-one; and when all of the light-emitting devices do not receive the alternating current, providing a storage current to the wireless communication module by the power stabilization module;

wherein the wireless communication module is electrically coupled to the power distribution module and the power stabilization module of each light-emitting device.

18. A lamp-state detection method of the traffic signal lamp, comprising:

when a selected-one of a plurality of light-emitting devices receives an alternating current, converting the alternating current into a first direct current by a power module of the selected-one, wherein each light-emitting device further comprises a light-emitting element configured to emit light, and color of the light of the light-emitting element of one of the light-emitting devices is different from color of the light of the light-emitting element of another of the light-emitting devices;

providing the first direct current to the light-emitting element of the selected one by the power module of the selected-one;

converting the alternating current into a second direct current by a power distribution module;

providing the second direct current to a power stabilization module by the power distribution module;

storing the second direct current as a storage current by the power stabilization module; and providing the storage current to the controller and the measuring element of each light-emitting device by the power distribution module.

19. The lamp-state detection method as claimed in claim 18, further comprising:

providing the storage current to the wireless communication module by the power stabilization module.

20. The lamp-state detection method as claimed in claim 18, further comprising:

receiving a driving information detected by the corresponding measuring element;

obtaining a difference between the driving information and a driving default value;

determining whether the difference exceeds a driving allowable range; and generating a driving abnormal signal when the difference exceeds the driving allowable range.

21. The lamp-state detection method as claimed in claim 18, further comprising:

receiving a luminance information of the corresponding light-emitting element;

obtaining a difference between the luminance information and a luminance preset value;

determining whether the difference exceeds a luminance allowable range; and generating a luminance abnormal signal when the difference exceeds the luminance allowable range.

* * * * *